United States Patent [19]

Wadlington

[11] 3,886,436
[45] May 27, 1975

[54] REGULATOR TO CONTROL TRACKING OF DUAL OUTPUT CONVERTER

[75] Inventor: James Carroll Wadlington, Summit, N.J.

[73] Assignee: Bell Telephone Laboratories, Incorporated, Murray Hill, N.J.

[22] Filed: Feb. 6, 1974

[21] Appl. No.: 440,066

[52] U.S. Cl. .......................... 323/8; 321/2; 323/17; 323/23; 323/DIG. 1
[51] Int. Cl. ...................... G05f 1/60; H02m 3/32
[58] Field of Search .............. 307/18, 24, 32, 33, 34; 321/2, 18; 323/8, 17, 22 T, 23, 25, DIG. 1

[56] References Cited
UNITED STATES PATENTS

| | | | |
|---|---|---|---|
| 3,581,104 | 5/1971 | Thew | 323/22 T |
| 3,660,672 | 5/1972 | Berger et al. | 323/8 X |
| 3,671,853 | 6/1972 | Weischedel et al. | 323/17 |

OTHER PUBLICATIONS

Sylvan, "Regulator Makes Two Power Supplies Out of One," EEE-Circuit Design Engineering, May 1966, pg. 117.
Kasson, "Voltage Splitter Balances Floating Power Supply," Electronics, March 21, 1966, pg. 96.

*Primary Examiner*—A. D. Pellinen
*Attorney, Agent, or Firm*—A. G. Steinmetz

[57] ABSTRACT

A tracking regulator for use in a dual output converter circuit controls the output signal balance by controllably storing energy and discharging it into the load to maintain signal balance. An energy storage device coupled with each output is selectively charged via a controlled charging path, which is responsive to the monitored output balance. The stored energy is discharged into the appropriate output of the converter in order to restore the signal balance.

7 Claims, 3 Drawing Figures

REGULATOR TO CONTROL TRACKING OF DUAL OUTPUT CONVERTER

BACKGROUND OF THE INVENTION

1. Field of the Invention

This invention relates to voltage regulated power supplies having dual outputs of opposite polarity. The invention is specifically concerned with a tracking regulator to balance the magnitudes of the dual polarity output voltages of a voltage regulated converter circuit.

2. Prior Art

Dual polarity output regulators to provide positive and negative voltages of equal magnitude require a tracking control to balance the two output voltages. Both voltages must be regulated so that both outputs are of equal magnitude. In addition, the total voltage sum of the dual outputs must be regulated. In the instance of a voltage regulated dual output converter circuit, the dual outputs may be controlled to track each other by utilizing a series type dual polarity voltage tracking regulator inserted between the converter output and the load to be energized. Such a dual polarity series tracking regulator is disclosed in U.S. Pat. No. 3,571,604, issued to F. C. La Porta et al. on Mar. 23, 1971 and assigned to the same assignee as herein.

The dual polarity tracking voltage regulator described therein comprises a series regulator to regulate the voltage of one polarity by comparison to a fixed reference voltage. The output voltage of the opposite polarity is regulated by responding to the difference in magnitude between the opposite polarity voltages and utilizing this difference to regulate the voltage of the opposite polarity.

Another method of controlling dual output voltages to track each other is to deflect unbalanced currents to ground. A typical arrangement utilizing this technique is disclosed by J. M. Kasson in an article entitled "Voltage Splitter Balances Floating Power Supply" published in *Electronics*, Mar. 21, 1966. In this circuit a differential amplifier responsive to an imbalance of the dual polarity output voltages controls gated current paths to conduct the resulting unbalanced current to ground and hence restore the output voltage balance.

Both the above tracking regulator arrangements balance the dual polarity output voltages through internal power dissipation therein to restore the voltage balance. This seriously reduces the overall operating efficiency of the regulator. This in turn reduces the power range in which dual tracking regulation may be achieved.

It is therefore an object of the invention to regulate tracking of a dual output converter with minimal internal dissipation of power.

It is another object of the invention to regulate the tracking of a dual output converter over a wide power range.

BRIEF DESCRIPTION OF THE INVENTION

In accordance with the invention, a tracking regulator compensates for imbalance in the output of a dual output converter by supplying current signals to correct for the voltage imbalance. The tracking regulator is connected between the converter's rectifier and the output filter. The tracking regulator monitors the balance of the output voltage and utilizes the monitored voltage balance to control energy storage in two capacitive storage devices. A capacitive storage device is connected to each of the outputs. The amount of energy stored is controlled by controlling the impedance of the charging path to the capacitive storage device in response to the output voltage imbalance. The controllable impedance may comprise transistors whose conductivity is controlled by an error signal which is responsive to the voltage imbalance at the dual outputs. This voltage imbalance is monitored by a differential amplifier having one input connected to a reference voltage and the other input connected to the center of a voltage divider shunting the two output voltage terminals of the converter. Energy is stored in the capacitive storage device during the rectified pulse output of each output rectifier terminal and then the energy is discharged into the output terminal, via an output filter, and a diode gate immediately following the pulse.

As is apparent from the foregoing, the prior art circuits dissipate unbalanced currents in order to establish voltage balance at the dual outputs. The present invention stores the unbalanced current output of the converter during the pulse output thereof and then subsequently gates it into the load circuit in order to reestablish the output voltage balance.

An advantage of the above tracking regulator arrangement is that it permits a current regulation scheme to operate from the primary side of the converter transformer since there are no series regulating impedances in series with the output load current.

BRIEF DESCRIPTION OF THE DRAWING

Further objects, features, and advantages of the invention will become apparent from the following detailed description, taken together with the drawing, in which.

DETAILED DESCRIPTION OF THE ILLUSTRATIVE EMBODIMENT

Figure 1:
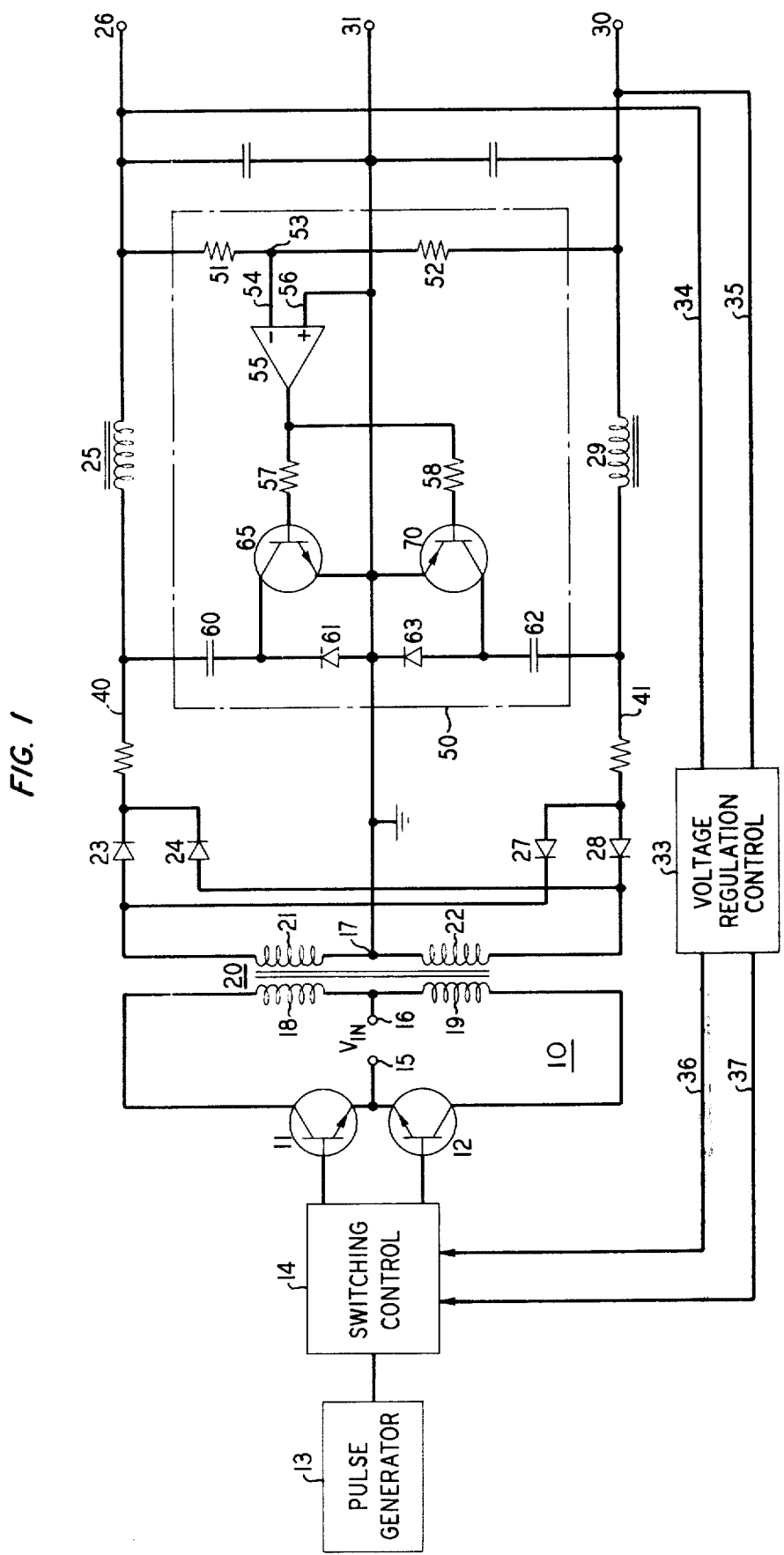
FIG. 1 is a partially schematic and partially block diagrammatic illustration of an embodiment of the invention.

In the DC to DC converter circuit of FIG. 1 an inverter circuit 10 having two oppositely phased switching transistors 11 and 12, driven by a pulse generator 13, via a switching control circuit 14, inverts a DC supply voltage applied at the input terminals 15 and 16. The driven switching transistors 11 and 12 generate a square wave voltage in the series connected primary windings 18 and 19 of the transformer 20. The alternately phased square wave pulses appear across the series connected secondary windings 21 and 22, respectively. The center tap 17 of the secondary windings is connected to ground. The positive pulse signals are transmitted, via rectifying diodes 23 and 24 and the filter inductor 25, to the positive output terminal 26. The negative pulse signals are transmitted, via the rectifying diodes 27 and 28 and the filter inductor 29, to the negative output terminal 30. The output signals at the positive and negative output terminals 26 and 30 are referenced to the grounded output terminal 31.

The absolute voltage difference between the output terminals 26 and 30 is controlled by the voltage regulation control 33 whose two input leads 34 and 35 are connected to the output terminals 26 and 30, respectively. The voltage regulation control 33 compares this absolute difference voltage with a reference voltage and generates control signals which are applied, via leads 36 and 37, to the switching control 14. The voltage regulation control 33 may comprise a reference voltage and a comparator circuit and a modulated pulse generator responsive to the comparator. The switching control 14 may comprise a gating circuit arrangement which steers the driving pulse output of the pulse generator 13 to alternately bias the switching transistors 11 and 12 conducting. The driving pulse duration is controlled in response to the modulated pulse signals on leads 36 and 37 which determine the time duration that the gates of the switching control actually conduct. It is apparent from the foregoing that the modulated pulse signals on leads 36 and 37 control the switching control 14 to pulse width modulate the driving pulse output of the pulse generator 13 in order to regulate the absolute sum voltage output of the converter. Such voltage regulation arrangements are well known to those skilled in the field of converters and a detailed explanation thereof is not believed necessary.

The sum of the positive and negative voltage outputs of the converter is regulated as described hereinabove by controlling the duty cycle of the inverter 10. However, the individual magnitudes of the positive and negative output voltages may become unequal. The voltage drops across the rectifying diodes or across output circuit impedances may differ. Hence, the respective positive and negative load currents may differ causing the positive and negative voltage to differ in magnitude even though the sum of these two voltages is regulated.

The respective magnitudes of the positive and negative output voltages are balanced by a tracking regulator circuit 50 connected between the rectifier and output filter of the converter. The tracking regulator circuit 50 comprises a voltage divider including the resistors 51 and 52 which are of equal impedance. The resistors 51 and 52 are connected in series and the series connection is connected across the positive and negative output terminals 26 and 30. An operational comparator amplifier 55 has its inverting input 54 connected to the center tap 53 of the voltage divider. The noninverting input 56 of the operational comparator amplifier 55 is connected to the reference ground of terminal 31. A series connected storage capacitor 60 and diode 61 connect the positive lead 40 to the ground of terminal 31. A series connected storage capacitor 62 and diode 63 connect the negative lead 41 to the ground of terminal 31. An NPN transistor 65 is shunted across the diode 61 and connects the storage capacitor 60 to the ground of terminal 31. A PNP transistor 70 is shunted across the diode 63 and connects the storage capacitor 62 to the ground of terminal 31. The output of the operational comparator amplifier 55 is connected, via the resistors 57 and 58, to the base electrodes of the transistors 65 and 70, respectively.

The operation of the tracking regulator may be readily understood by describing the response of the tracking regulator to an imbalance in the positive and negative output voltages of the converter.

Figure 2:
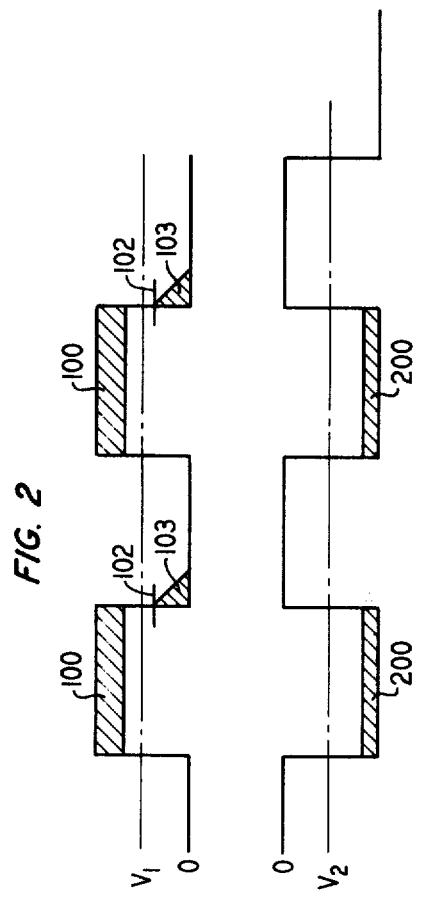
FIG. 2 is a diagram of a voltage waveform illustrating the operation of the tracking regulator.

Assume, for example, that the magnitude of the positive voltage at terminal 26 has decreased below the magnitude of the negative voltage at terminal 30. The voltage change may be due to an inequality of the load currents. This inequality of load currents may be due to unequal loads, unequal rectifier drops, or unequal line impedances, for instance. These internal voltage drops are illustrated by the shaded areas 100 and 200 in the waveforms $V_1$ and $V_2$ shown in FIG. 2. The waveform $V_1$ represents the unfiltered voltage on lead 40 and the waveform $V_2$ represents the unfiltered voltage on lead 41.

Normally when the positive and negative outputs are equal, the center tap 53 of the voltage divider is at ground potential. Since the sum of the voltages at terminals 26 and 30 is regulated, a drop in one voltage will increase the magnitude of the voltage of the other polarity. In the present example the voltage at center tap 53 will become negative with respect to ground. The output of the operational amplifier 55 will be positive with respect to the ground reference voltage level since ground is connected to the noninverting input and the center tap 53 is connected to the inverting input. This signal is applied, via resistors 57 and 58, to the base electrodes of the transistors 65 and 70, respectively.

It is apparent from the foregoing that the transistor 65 is biased conducting and the transistor 70 is biased nonconducting. The lead 40, capacitor 60, and the conducting transistor 65 create a charging path for the capacitor 60. This charging occurs during the positive pulse output of the diodes 23 and 24. The transistor 70 is nonconducting and the capacitor 62 is not charged.

Due to the higher voltage drops and increased load currents in the positive output circuit of the converter, the shaded area 100 in waveform $V_1$ exceeds the shaded area 200 in waveform $V_2$. Hence, the average positive voltage $V_1$ is less in magnitude than the average negative voltage $V_2$. In the instant embodiment the capacitor 60 is charged a sufficient amount to offset the difference between the voltage time areas 100 and 200. The voltage level to which capacitor 60 is charged is shown by the voltage level 102 in FIG. 2. The area of voltage time discharge is shown by shaded area 103 in FIG. 2. The area 103 is equal to the difference between the areas 100 and 200.

As described above, during the positive pulse output the capacitor 60 is charged to the voltage level 102 which is determined by the difference between the voltage areas 100 and 200. During this charging process the diode 61 is reverse biased. At the termination of the positive pulse the current inertia of the filter inductor 25 attempts to maintain the same current by acting as a current source. The inertial current action of the inductor 25 forward biases the diode 61. This completes a discharge path from ground to the output terminal 26 via the diode 61, the capacitor 60, and the filter inductor 25. The amount of charge discharged into the load is shown by the shaded area 103 which, as described above, is sufficient to restore the voltage balance between the positive and negative outputs.

It is apparent from the foregoing that should the positive voltage output exceed the negative voltage output the transistor 70 is biased into conduction. The capacitor 62 is charged and discharged into the negative output terminal 30 to restore the voltage balance.

Figure 3:
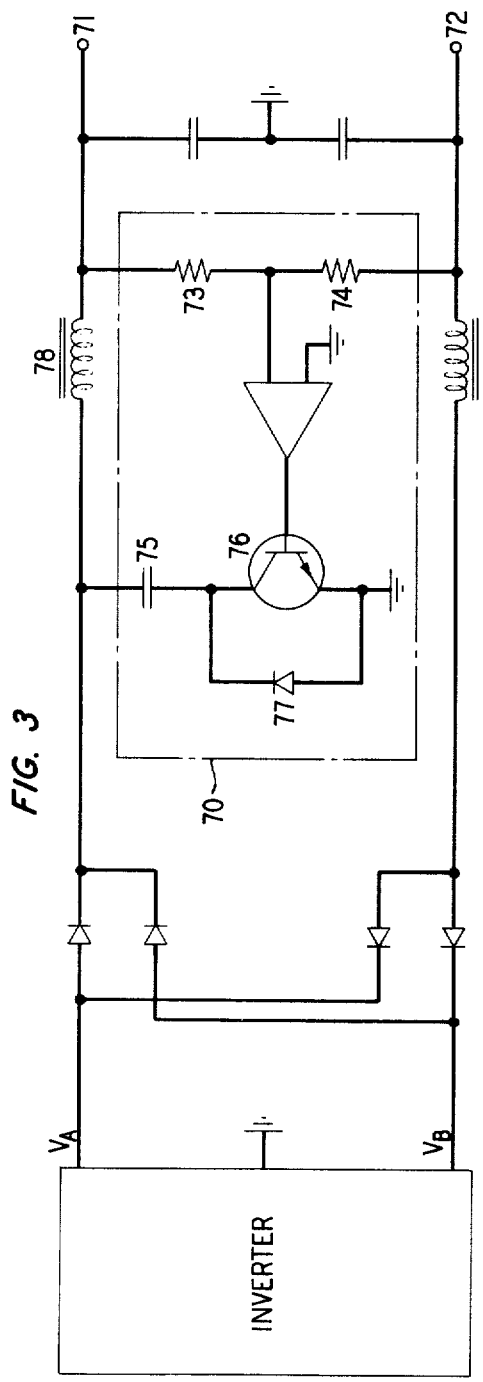
FIG. 3 is a partially schematic and partially block diagrammatic illustration of another embodiment of the invention.

It will be apparent to those skilled in the art that while the invention herein is particularly useful in maintaining balanced voltage outputs, it may also be used to maintain specific voltage ratios. In this instance the impedance ratio of the resistors in the voltage divider would be the same as the voltage ratio desired. A regulator embodiment to maintain a voltage ratio is disclosed in FIG. 3. The two output voltages of opposite polarity are to be maintained at a fixed ratio. The magnitude of the positive voltage at output terminal 71 is to be less than the magnitude of the negative voltage at output terminal 72. The impedance ratio of the resistors 73 and 74 reflect the voltage ratio to be maintained. The impedance of resistor 74 is greater than the impedance of resistor 73.

The inverter output transformer is wound so that the average value of voltage $V_A$ is slightly less than the desired output voltage. Hence an asymmetrical tracking regulator 70 may be utilized. The storage capacitor 75 is charged, via transistor 76, during each positive pulse output and discharged via diode 77 and filter inductor 78 immediately following each pulse to maintain the desired voltage ratio at the output terminals 71 and 72.

While two specific examples of the invention have been disclosed, many variations will be apparent to those skilled in the art without departing from the spirit and scope of the invention.

What is claimed is:

1. In a converter circuit including dual output means comprising rectifier means and filter means,
   a tracking regulator comprising,
   means to monitor the output signal ratio of the dual output means,
   energy storage means coupled to said dual output means at a junction of said rectifier means and said filter means,
   charging control means responsive to said means to monitor to control the charging of said energy storage means, and
   gating means connected in series with said energy storage means, said gating means responding to a voltage induced by said filter means to discharge the energy stored in said energy storage means into at least one of said dual output terminals to maintain the desired output signal ratio.

2. A converter circuit as described in claim 1 wherein said energy storage means comprises, a first capacitor coupled to one of said dual output means and a second capacitor coupled to the other of said dual output means, and said means to monitor comprises, a voltage divider shunting the dual output means and a comparator amplifier connected to compare the midpoint voltages of the voltage divider with respect to ground, and a first and second transistor responsive to said comparator amplifier and connected to complete a charging path for said first and second capacitors, respectively.

3. Apparatus to regulate tracking in a dual polarity output power supply having output rectifiers, dual output filters, and dual output terminals, a common reference terminal, means to monitor the magnitude balance of the dual polarity voltages of the dual output terminals with respect to the common reference terminal,
   a first and second energy storage means connected to said dual output filters and said output rectifiers,
   means responsive to said means to monitor to control the charging of said first and second energy storage means from said rectifiers,
   first and second gating means connected to said first and second energy storage means and responsive to voltages induced by said dual output filters to enable the discharge of said first and second energy storage means into said dual output terminals to maintain the magnitude balance of the dual polarity voltages.

4. Apparatus as described in claim 3 wherein said means to monitor comprises, a voltage divider shunted across the dual output terminals and a comparator amplifier connected to the midpoint of said voltage divider and to the common reference terminal of said dual output terminals and said responsive means comprising, first and second transistors of opposite polarity type responsive to the output of said comparator amplifier.

5. A tracking regulator to maintain a fixed ratio between the dual output voltages of a dual output power supply generating dual pulse outputs which are coupled to dual filtering means, and dual output terminals connected in series, said tracking regulator comprising,
   means to monitor the ratio of the dual output voltages including a common reference terminal and dual impedances in the desired ratio interconnecting the dual output terminals, at least an energy storage device coupled via at least one of said dual filtering means to the one of the dual output terminals having the lesser magnitude,
   means to compare the ratio of the dual output voltages with the voltage drop ratio across said dual impedances,
   charging control means responsive to said means to compare the ratio to control the charging of said energy storage device by said pulse outputs, and
   gating means to discharge the energy stored in said energy storage device into the one of the dual output terminals having the lesser magnitude to maintain the said fixed ratio.

6. A tracking regulator to maintain a balance between the dual output voltages of a power supply having dual output terminals of opposite polarity comprising,
   means to monitor the balance of the dual output voltages including a common reference terminal and two series connected impedances of equal value connected at a common junction, said series connected impedances interconnecting the dual output terminals of said power supply,
   a first and second energy storage capacitor respectively coupled to each of said dual output terminals,
   means to compare the voltage at the common junction with the voltage at the common reference terminal,
   charging control means including a first and second transistor coupling said first and second energy storage capacitors to said common reference terminal, said first and second transistors being responsive to said means to compare to control the charging of said first and second energy storage capacitors, respectively, and
   gating means to discharge the energy stored in said first and second energy storage capacitors into one of said dual output terminals in order to maintain said voltage balance, said gating means comprising first and second diodes connected in series with said first and second energy storage capacitors and said dual output terminals, respectively.

7. A power supply comprising, a source of pulse signals of one polarity, a second source of pulse signals of the opposite polarity, first and second filter means to derive DC signals of opposite polarity from said first and second pulse signals, first and second output terminals connected to said first and second filter means, a common reference for said first and second output terminals, a first capacitor and a first diode connected in series and connecting said source of pulse signals of one polarity to said common reference, said first diode poled to conduct current in response to said first filter means, a first transistor of one polarity type shunting said first diode and having its conductivity direction opposite to that of said first diode, a second capacitor and a second diode connected in series and connecting said second source of pulse signals of the opposite polarity to said common reference, said second diode poled to conduct current in response to said second filter means, a second transistor of an opposite polarity type shunting said second diode and having its conductivity direction opposite to that of said second diode, a voltage divider having a first and second impedance of equal magnitude connected in series and interconnecting said first and second output terminals, a comparator amplifier having a first input connected to said common reference and a second input connected to the junction of said first and second impedances, the output of said comparator amplifier being connected in parallel to the control electrode of said first and second transistors whereby in response to unequal signal magnitudes at said first and second output terminals one of said transistors is biased conducting to charge one of said capacitors and the series connected one of said diodes is biased conducting by the filter to discharge the capacitor into an output terminal to restore the balance of magnitudes.

* * * * *